United States Patent [19]

Okuda et al.

[11] 4,166,366
[45] Sep. 4, 1979

[54] UNIVERSAL JOINT

[75] Inventors: Hiroji Okuda; Akira Imada, both of Kitakatsuragigun, Japan

[73] Assignee: Koyo Seiko Company Limited, Osaka, Japan

[21] Appl. No.: 818,956

[22] Filed: Jul. 25, 1977

[30] Foreign Application Priority Data

May 13, 1977 [JP] Japan .................... 52-61946[U]

[51] Int. Cl.² ............................................ F16D 3/26
[52] U.S. Cl. .................................. 64/17 SP; 64/17 R
[58] Field of Search ................ 64/17 SP, 31, 17 R

[56] References Cited

U.S. PATENT DOCUMENTS

| 826,756 | 7/1906 | Waldron | 64/17 SP |
|---|---|---|---|
| 2,669,316 | 2/1954 | Schjolin | 64/17 SP |
| 2,770,114 | 11/1956 | Slaght | 64/17 R |
| 2,813,409 | 11/1957 | Walcott | 64/17 R |
| 3,159,013 | 12/1964 | Mazziotti | 64/17 R |
| 3,800,557 | 4/1974 | Tobin | 64/17 SP |
| 3,835,667 | 7/1974 | King | 64/17 R |

FOREIGN PATENT DOCUMENTS 696342  10/1964  Canada ..................... 64/17 R

Primary Examiner—Charles J. Myhre
Assistant Examiner—R. C. Turner
Attorney, Agent, or Firm—Mason, Fenwick & Lawrence

[57] ABSTRACT

A universal joint comprises a first pin disposed with its axis intersecting the axis of a first yoke at right angles thereto, a second pin disposed with its axis intersecting the axis of a second yoke at right angles thereto and positioned at right angles to the axis of the first pin, and a connecting member disposed between the first and second pins. The axes of the first and second pins intersect the axis of the connecting member as spaced apart from each other by a suitable amount of offset. The pins are provided at their opposite ends trunnions of increased diameter, giving the universal joint a greatly increased torque transmitting capacity.

3 Claims, 3 Drawing Figures

UNIVERSAL JOINT

BACKGROUND OF THE INVENTION

The present invention relates to a universal joint, and more particularly to a universal joint for use with drive spindles of the type which are subjected to high load.

With drive spindles including a universal joint and incorporated in heavy-duty mechanical apparatus such as rolling mills, the trunnion neck portion of the yoke pin included in the universal joint is structurally the weakest portion of the spindle and is therefore prone to fracture when subjected to dynamic load and even when subjected to static load. Accordingly, trunnions of universal joints heretofore used are designed to have the largest possible diameter so as to minimize the bending stress of the trunnion neck portion relative to the torque acting on the bearing.

FIG. 1 shows a universal joint in which the diameter d of a trunnion 1 is made as large as possible. Since the swing diameter D of the universal joint is limited, the joint is so designed that the working angle of the joint is minimized for example to 5° to 10°, with the smallest possible clearance S formed between the circumferentially adjacent bearing cases 2 in order to give the trunnion 1 an increased diameter. However, the limitation on the working angle of the universal joint is restricted; the set of components including the trunnion 1, bearing case 2, needle-like rollers 3 and unillustrated fastening bolts must be confined to a space within an angular range of 90° about the center. The space thus limited imposes a restriction on the diameter of the trunnion 1 and therefore on the increase of the strength of the trunnion neck portion. Thus, it is impossible to obtain the desired strength, making it extremely difficult to increase the torque capacity of the drive spindle.

SUMMARY OF THE INVENTION

An object of this invention is to overthrow such a fixed concept about conventional universal joints, especially about the structure of the yoke pin thereof and to provide a universal joint of fully increased strength and therefore greatly increased torque capacity.

Another object of this invention is to provide a universal joint of greatly increased torque capacity in which the swing diameter can be made rather smaller than in conventional joints.

The universal joint of this invention comprises a first pin disposed with its axis intersecting the axis of a first yoke at right angles thereto, a second pin disposed with its axis intersecitng the axis of a second yoke at right angles thereto and positioned at right angles to the axis of the first pin, and a connecting member disposed between the first and second pins. The axes of the first and second pins intersect the axis of the connecting member as spaced apart from each other by a suitable amount of offset on the axis of the member.

According to this construction, the set of components for one pin of the universal joint can be arranged within an angular range of 180° about the center (although such a large angular range is not actually required), making it possible to use a trunnion of as large a diameter as is desired, to greatly increase the torque transmitting capacity of the joint and to completely eliminate fracture or like accident of the trunnion. Although the number of fastening bolts for the bearing case is limited to two with conventional universal joints because of the space limitation, four bolts are usable for the bearing case according to this invention, permitting the case to be fastened to place with greater strength than in conventional joints. It is also possible to provide a universal joint of smaller swing diameter D than in conventional joints and to thereby impart greatly improved strength to the constituent parts. The universal joint is therefore serviceable under greater load. Since the pins are used in place of the yoke pin of the cross type, the pins, when designed as separate individual pieces independent of the yoke and connecting member, can be made with much simplified procedures of forging, cutting, grinding, etc.

DESCRIPTION OF THE PREFERRED EMBODIMENTS

Figure 1:
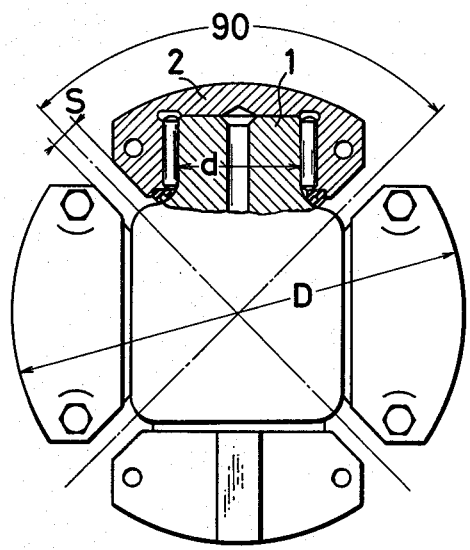
FIG. 1 is a front view showing a conventional universal joint partly in section.
Figure 2:
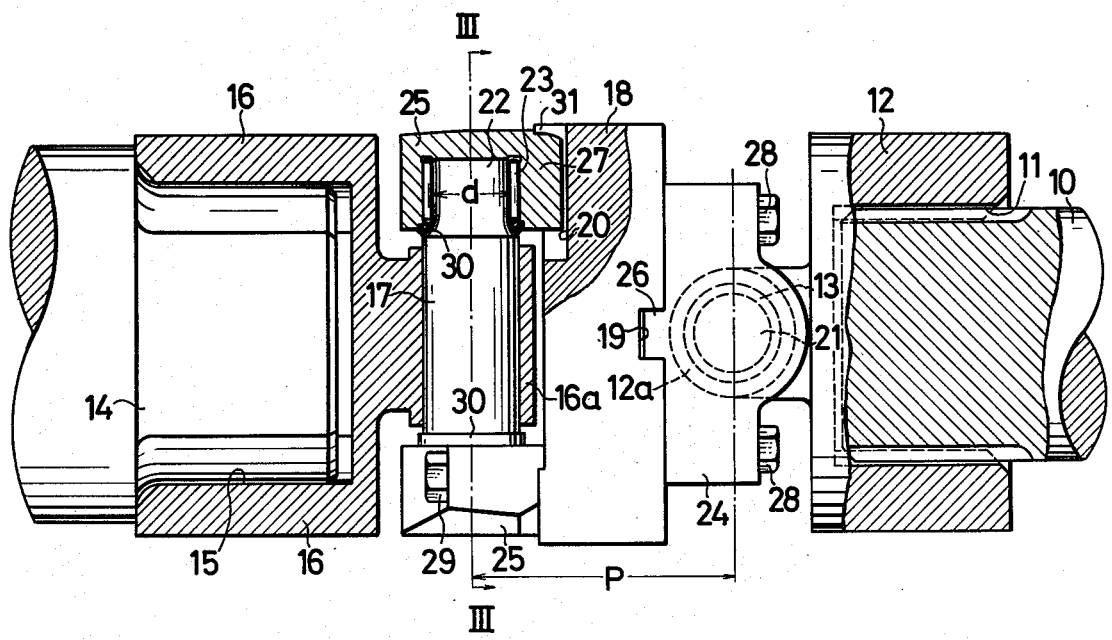
FIG. 2 is a side elevation showing an embodiment of this invention partly in section.

This invention will be described below with reference to an embodiment. FIG. 2 shows a drive shaft 10 to the end of which a first yoke 12 is splined as at 11 or otherwise connected for rotation therewith. A pin 13 is integral with the yoke 12 or is a separate member connected to the yoke 12 by a projecting 12a on the end of the yoke. The pin 13 is positioned with its axis intersecting the axis of the yoke 12 at right angles thereto. A second yoke 16 is fittable to a roll end 14 or like driven shaft for rotation therewith, for example with the shaft fitting in an oval rectangular bore 15 formed in the yoke 16. A pin 17 is integral with or is a separate member connected to the yoke 16 by a connecting portion 16a on the end of the second yoke 16. The pin 17 has an axis intersecting the axis of the yoke 16 at right angles thereto. The pins 13, 17, when prepared as separate members, are joined to the yokes 12, 16 in suitable manner as by welding.

A connecting member 18 in the form of a disk is formed in its opposite side faces with keyways 19, 20 extending at right angles with each other. The pins 13, 17 are provided at their opposite ends with trunnions 21, 22 fitting in bearing cases 24, 25 with needle-like rollers 23 interposed therebetween. The bearing cases 24, 25 are sesured to the corresponding sides of the connecting member 18 by bolts 28, 29, with keys 26, 27 on the cases 24, 25 engaging in the keyways 19, 20. The pins 13, 17 are so arranged that the axes thereof intersect the axis of the connecting member 18 as spaced apart from each other by a suitable amount of offset P on the axis of the member 18. The axes of the pins 13, 17 are at right angles to each other about the axis of the connecting member 18. Indicated at 30 are sealing means for sealing the bearings, and at 31 flanges for setting the bearing cases 24, 25 in position by engagement with their outer peripheral portions.

Figure 3:
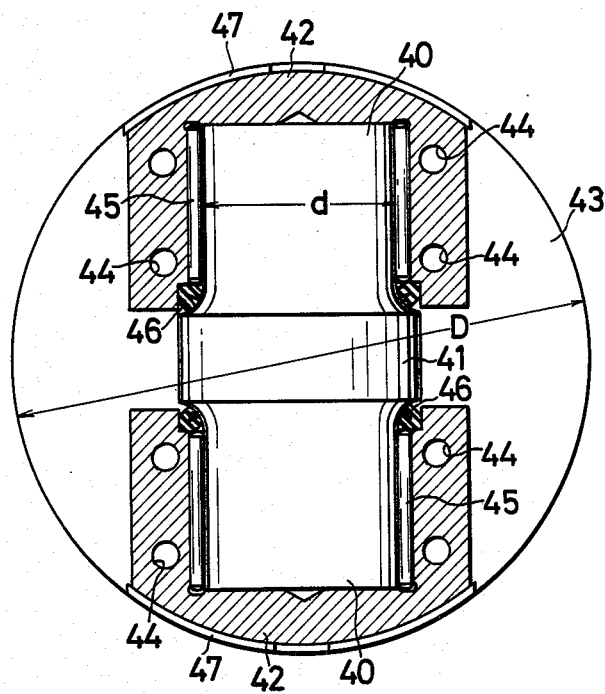
FIG. 3 is a view in cross section taken along a line corresponding to the line III—III in FIG. 1 and showing another embodiment of this invention.

FIG. 3 is a view in section showing another embodiment of this invention and taken along a line corresponding to the line III—III in FIG. 2. A pin 41 provided at its opposite ends with trunnions 40 is connected to an unillustrated yoke in the same manner as in FIG. 2. Bearing cases 42 are secured to a connecting member 43 in the same manner as in FIG. 2. In this embodiment, each bearing case 42 has four bolt holes 44 so that the case can be fastened to the connecting member 43 with greater strength than in the case of FIG. 2 in which each of the bearing cases 24, 25 is secured to the connecting member 18 with two bolts 28 or 29. This permits an increase in the ratio of the trunnion diameter d to the swing diameter D. Indicated at 45 are needle-like rollers, at 46 sealing means, and at 47 flange on the connecting member 43 for positioning the cases in place.

With the embodiment described above, the first yoke 12 is splined to the drive shaft 10, while the roll neck 14 is fitted in an oval rectangular bore of the second yoke 16 for connection. These mating portions can be made fittable together in any other manner insofar as the torque transmission is ensured. Furthermore, the driven shaft is not limited to the roll end of rolling mills. Although the pins 13, 17 are shown as connected to the corresponding yokes 12, 16 respectively in the foregoing embodiment, it will be readily understood from the above description that the bearing cases are mountable on the yokes 12, 16, with the pins 13, 17 connected to the connecting member 18. Further in the case of such an arrangement, the pins 13 and 17 may be directly connected together by suitable means as a unit or may be provided as an integral piece, such that their axes are spaced apart from each other by a suitable amount of offset P on the axis of the connecting portion therebetween. Needless to say, these modifications are included within the present invention.

What is claimed is:

1. A universal joint comprising:
   a first yoke fittable to a drive shaft, the first yoke being fitted through splined engagement to an end of the drive shaft for integral rotation,
   a first pin provided for the first yoke with its axis intersecting the axis of the first yoke at right angles thereto, the first pin being supported integrally by the first yoke and having a trunnion of a large diameter at each of its opposite ends,
   a second yoke fittable to a driven shaft, the second yoke being fitted through engagement between an oval-shaped bore and a corresponding part of an end of the driven shaft for integral rotation,
   a second pin provided for the second yoke with its axis intersecting the axis of the second yoke at right angles thereto, the second pin being supported integrally by the second yoke and having a trunnion of a large diameter at each of its opposite ends,
   a connecting member disposed between the first and second pins, the connecting member positioning the first and second pins with their axes intersecting the axis of the connecting member as spaced apart from each other by a desired amount of offset and at right angles on the axis of the connecting member,
   two bearing cases each fitting to each of the trunnions of the first pin with a bearing member interposed therebetween, the bearing cases being mounted on and secured by a plurality of bolts to one end face of the connecting member and positioning the first pin on that one side of the connecting member, and
   two bearing cases each fitting to each of the trunnions of the second pin with a bearing member interposed therebetween, the bearing cases being mounted on and secured by a plurality of bolts to the other end face of the connecting member and positioning the second pin on that other side of the connecting member.

2. A universal joint as defined in claim 1 wherein the first yoke is integral with the first pin, and the second yoke is integral with the second pin.

3. A universal joint as defined in claim 1 wherein the first and second pins are separate individual pieces and are connected to the first yoke and the second yoke respectively.

* * * * *